3,737,394
CATALYTIC PROCESS FOR UNSATURATED ACIDS

Jamal S. Eden, Akron, Ohio, assignor to The B. F. Goodrich Company, New York, N.Y.
No Drawing. Original application June 27, 1969, Ser. No. 837,356. Divided and this application Apr. 5, 1971, Ser. No. 131,502
Int. Cl. B01j *11/82*
U.S. Cl. 252—435     4 Claims

ABSTRACT OF THE DISCLOSURE

Unsaturated acids in high yields along with smaller yields of aldehydes, as acrylic acid and acrolein or methacrylic acid and methacrolein, are prepared in excellent yields by the oxidation of an olefin as propylene or isobutylene in the presence of a catalyst containing cobalt molybdate, tellurium oxide and phosphorus oxide.

This is a division of application Ser. No. 837,356, filed June 27, 1969.

BACKGROUND OF THE INVENTION

Catalytic processes have been proposed for preparing unsaturated aldehydes and unsaturated carboxylic acids by oxidation of olefins at an elevated temperature. In many such processes high conversion of feed stock to the desired products in good efficiency has been less than desired. This represents loss of feed and desired products.

SUMMARY OF THE INVENTION

I have found that when olefins such as propylene or isobutylene are reacted with oxygen at an elevated temperature in the presence of a catalyst initially containing cobalt molybdate, tellurium oxide and phosphorus pentoxide, in a molar ratio 1–10 of each component, that excellent conversion and yield of propylene to acrylic acid with acrolein are obtained.

DETAILED DESCRIPTION

The reactants for providing acids and aldehydes are propylene or isobutylene, a molecular oxygen-containing gas which can be pure oxygen, oxygen diluted with an inert gas, oxygen enriched air or air per se.

Stoichiometric ratios of oxygen to olefin for the purposes of this invention are 1.5:1. While lower ratios of oxygen can be used at a sacrifice of yield, it is preferred to use an excess of oxygen. Large excesses of oxygen while not undesirable, introduce process problems and an amount of oxygen from about 2 to about 6 mols of oxygen per mol of olefin in an adequate range.

The use of steam in the reaction while desirable is not absolutely essential. The amount of steam used may be varied from about 0 to 10 or more mols per mol of olefin. Other diluent gases such as nitrogen, saturated hydrocarbons such as propane may be used if desired.

The reaction may be carried out in either fixed or fluidized catalyst bed.

The reaction temperature can range from above 300° C. to about 550° C. A preferred range is from about 350° C. to about 475° C.

The contact time may vary considerably in the range of greater than 0.1 second. Good results have been obtained within the range of about 2 to about 60 seconds. While advantage may be taken of the short contact time, longer times may be used if desired.

The reaction may be conducted at atmospheric pressure, in a partial vacuum, or under induced pressures up to 100 p.s.i. or higher. Atmospheric pressure is preferred for fixed bed systems and higher pressures for fluid bed reactions.

The particle size of the catalyst for fixed bed operations may be from about 10 to 18 mesh. Larger and smaller size particles may be used in fixed beds if desired. For fluid bed operations, catalyst size normally will range from about 80 to 325 mesh (U.S. Sieve).

The active catalyst containing cobalt molybdate, tellurium oxide and phosphorus oxide may be prepared by a number of methods and may be supported or unsupported. The catalyst ingredients may be mixed in the form of solutions or slurries, or can be dry blended. Supported catalysts may be prepared by adding a dry support or aqueous slurry thereof to the catalyst ingredients. Among suitable supports are silica, silica-containing alumina, titania, zirconia, materials such as diatomaceous earth, kieselguhr, silicon carbide, clay, aluminum oxides and the like.

An unsupported catalyst can be prepared by dissolving phosphomolybdic acid in water, and adding cobalt chloride in water, then telluric acid and phosphoric acid in water.

Resulting mixture is heated with mixing and the mixture is evaporated to dryness on a steam bath and calcined in a hot tube oven for 16 hours at 450° C. The catalyst is ground to the desired mesh size. Alternative, powdered cobalt molybdate and ammonium tellurate may be mixed with phosphoric acid, a dry support added thereto if desired, and dried.

A supported catalyst was prepared by mixing a water slurry containing 0.25 mol of $CoMoO_4$ with 69.96 grams of finely divided low surface silica slurried in water. A slurry containing 26.15 grams (0.083 mol) of ammonium tellurate was added to this mixture and 28.87 grams (0.25 mol) of 85% phosphoric acid. The mix was dried and calcined at 400° C. for 16 hours, cooled and formed to a mesh size of 10–18 for fixed bed operations. The catalyst has a molar ratio of 75 $CoMoO_4$, 25 $TeO_2$, 37.5 $P_2O_5$ and 275 $SiO_2$.

The catalysts generally contain a molar ratio of 1–10 cobalt molybdate, 1–10 tellurium oxide, 1–10 phosphorus oxide. A more preferred range based on one mol of cobalt molybdate is 0.1 to 1 of tellurium oxide and 0.1 to 2 of phosphorus pentoxide.

Examples

Runs were made in a fixed bed reactor of a high silica (Vycor) glass tube 12" long and 30 mm. outer diameter. The reactor had inlets for air, steam and propylene. External electrically operated heating coils were wound on the reactor. Outlet vapors were passed through a water cooled condenser and the uncondensed gases were passed through a gas chromatograph and analyzed continuously. The liquid condensate was weighed and analyzed for unsaturated acid and aldehyde in the gas chromatograph. 125 ml. of the silica supported catalysts prepared as described above was placed in the reactor. Steam at a temperature of 200 to 250° C. was first fed into the reactor, and thereafter propylene and air were separately fed into the reactor from preheaters at a temperature of about 200 and 250° C. Before the propylene was added, the reactor was preheated to about 285° C. The molar ratio of reactants used based on one mol of propylene as steam and oxygen (air), the reaction temperature, contact time (calculated at room temperature and pressure), percent conversion of propylene and yield of acrolein and acrylic acid based on propylene converted in the several runs are set forth in the Table I.

TABLE I

| Run | Temp. (°C.) | Contact time, seconds | Oxygen, mols | Water, mols | Mol percent C$_3$H$_6$ conv. | Mol percent yield on C$_3$H$_6$ conv. Acrolein | A. acid |
|---|---|---|---|---|---|---|---|
| 1 | 397 | 44 | 3.04 | 4.2 | 98.53 | 31.96 | 46.41 |
| 2 | 415 | 34 | 3.0 | 4.06 | 98.72 | 30.36 | 49.26 |
| 3 | 420 | 34 | 3.0 | 4.06 | 99.37 | 19.57 | 55.91 |
| 4 | 415 | 36 | 4.02 | 4.2 | 99.60 | 10.25 | 61.22 |
| 5 | 435 | 36 | 4.02 | 4.2 | 99.66 | 13.43 | 60.80 |
| 6 | 428 | 36 | 4.02 | 4.2 | 99.86 | 14.30 | 62.59 |
| 7 | 445 | 27 | 4.02 | 4.2 | 100 | 18.72 | 50.11 |

Another catalyst was made in the same manner as that described for the above example except 178 grams of silica were used and the concentration of active catalyst on silica was 32%. The dried catalyst was calcined at 450° C. for 16 hours and ground to about 325 mesh. The catalyst was placed in a fluid bed reactor and a series of runs made under the reaction conditions set forth in the Table II below.

TABLE II

| Run | Temp. (°C.) | Contact time, seconds | Oxygen, mols | Water, mols | Mol percent C$_3$H$_6$ conv. | Mol percent yield on C$_3$H$_6$ conv. Acrolein | A. acid |
|---|---|---|---|---|---|---|---|
| 1 | 420 | 27 | 4.03 | 4.06 | 97.34 | 16.01 | 46.05 |
| 2 | 395 | 36 | 4.02 | 4.2 | 98.94 | 12.44 | 51.06 |
| 3 | 405 | 36 | 4.02 | 4.2 | 98.32 | 10.19 | 53.63 |
| 4 | 400 | 34 | 3.0 | 4.06 | 98.17 | 14.16 | 50.89 |

I claim:
1. A catalyst consisting essentially of cobalt molybdate, tellurium oxide and phosphorus oxide in a molar ratio of 1-10:1-10:1-10.
2. A catalyst of claim 1 containing CoMoO$_4$, TeO$_2$ and P$_2$O$_5$ in a molar ratio of 1:0.1-1:0.1-2.
3. A catalyst of claim 2 on a support.
4. A catalyst of claim 3 on a silica support.

References Cited

UNITED STATES PATENTS 3,240,806 3/1966 Bethell et al. _____ 260—533 N
3,065,264 11/1962 Koch et al. _____ 260—533 N
3,492,247 1/1970 Eden _____ 252—437

PATRICK P. GARVIN, Primary Examiner

U.S. Cl. X.R.

252—437; 260—533 N